(12) United States Patent
Ohran et al.

(10) Patent No.: US 6,871,271 B2
(45) Date of Patent: Mar. 22, 2005

(54) INCREMENTALLY RESTORING A MASS STORAGE DEVICE TO A PRIOR STATE

(75) Inventors: Richard S. Ohran, Henderson, NV (US); Michael R. Ohran, Orem, UT (US)

(73) Assignee: EMC Corporation, Hopkinton, MA (US)

(*) Notice: Subject to any disclaimer, the term of this patent is extended or adjusted under 35 U.S.C. 154(b) by 308 days.

(21) Appl. No.: 10/029,189

(22) Filed: Dec. 20, 2001

(65) Prior Publication Data

US 2002/0112134 A1 Aug. 15, 2002

Related U.S. Application Data

(60) Provisional application No. 60/257,499, filed on Dec. 21, 2000.

(51) Int. Cl.[7] ............................................. G06F 12/16
(52) U.S. Cl. ..................... 711/162; 711/161; 711/167; 714/6; 707/204
(58) Field of Search ................................. 711/102, 103, 711/104, 111, 112, 161, 162, 167; 707/204; 714/6

(56) References Cited

U.S. PATENT DOCUMENTS

| | | | |
|---|---|---|---|
| 4,467,421 A | 8/1984 | White | 364/200 |
| 5,038,278 A | 8/1991 | Steely, Jr. et al. | 364/200 |
| 5,086,502 A | 2/1992 | Malcolm | 395/575 |
| 5,089,958 A | 2/1992 | Horton et al. | 395/575 |
| 5,157,663 A | 10/1992 | Major et al. | 371/9.1 |
| 5,163,148 A | 11/1992 | Walls | 395/600 |
| 5,175,849 A | 12/1992 | Schneider | 395/600 |
| 5,201,044 A | 4/1993 | Frey, Jr. et al. | 395/575 |
| 5,241,668 A | 8/1993 | Eastridge et al. | 395/575 |
| 5,241,669 A | 8/1993 | Cohn et al. | 395/575 |
| 5,241,670 A | 8/1993 | Eastridge et al. | 395/575 |
| 5,263,154 A | 11/1993 | Eastridge et al. | 395/575 |
| 5,349,655 A | 9/1994 | Mann | 395/575 |
| 5,375,232 A | 12/1994 | Legvold et al. | 395/575 |
| 5,379,398 A | 1/1995 | Cohn et al. | 395/425 |
| 5,379,412 A | 1/1995 | Eastridge et al. | 395/575 |
| 5,403,639 A | 4/1995 | Belsan et al. | 395/600 |
| 5,410,667 A | 4/1995 | Belsan et al. | 395/425 |
| 5,414,850 A | 5/1995 | Whiting | 395/700 |
| 5,426,747 A | 6/1995 | Weinreb et al. | 395/400 |
| 5,435,004 A | 7/1995 | Cox et al. | 395/575 |
| 5,448,718 A | 9/1995 | Cohn et al. | 395/404 |

(List continued on next page.)

OTHER PUBLICATIONS

IBM Corp, IBM Technical Disclosure Bulletin, *Storage Management Mechanism for Managing Snapshot Pages*, pp. 26–29, Sep. 1992, author unknown.

Veritas Software Corp., *Veritas File System (VxFS) System Administrator's Guide*, circa Feb. 1992, author unknown.

Sale of Veritas File System (VxFS) Software, circa 1992, sold by Veritas Software Corporation.

Primary Examiner—Mano Padmanabhan
Assistant Examiner—Jasmine Song
(74) Attorney, Agent, or Firm—Workman Nydegger (57) ABSTRACT

Restoring a mass storage device, including the corresponding data blocks stored thereon, to a state in which it existed at a prior instant in time to minimize the data loss caused by data blocks becoming corrupt or lost. After a mirrored or backup copy has been made, data blocks that are to be overwritten in response to a write request are stored in a preservation memory prior to being overwritten. The data blocks stored in the preservation memory are time-stamped to designate the chronological order by which the data blocks were overwritten. If data becomes corrupted, the data blocks of the preservation memory are applied to the corrupted data in reverse chronological order until such time that a valid, non-corrupted set of data is obtained. In this manner, data more recent than that associated with the full mirrored or backup copy can be reconstructed.

30 Claims, 5 Drawing Sheets

U.S. PATENT DOCUMENTS

| | | | |
|---|---|---|---|
| 5,455,932 A | 10/1995 | Major et al. | 395/489 |
| 5,515,502 A | 5/1996 | Wood | 395/182.13 |
| 5,546,534 A | 8/1996 | Malcolm | 395/182.04 |
| 5,608,684 A * | 3/1997 | Reasoner et al. | 365/228 |
| 5,638,508 A | 6/1997 | Kanai et al. | 395/182.18 |
| 5,638,509 A | 6/1997 | Dunphy et al. | 395/182.18 |
| 5,649,152 A | 7/1997 | Ohran et al. | 395/441 |
| 5,649,196 A | 7/1997 | Woodhill et al. | 395/620 |
| 5,664,186 A | 9/1997 | Bennett et al. | 395/620 |
| 5,696,967 A | 12/1997 | Hayashi et al. | 395/618 |
| 5,706,470 A | 1/1998 | Okada | 395/488 |
| 5,719,889 A | 2/1998 | Iadanza | 371/49.3 |
| 5,819,020 A | 10/1998 | Beeler, Jr. | 395/182.03 |
| 5,835,953 A * | 11/1998 | Ohran | 711/162 |
| 5,845,292 A | 12/1998 | Bohannon et al. | 707/202 |
| 6,073,209 A * | 6/2000 | Bergsten | 711/114 |
| 6,073,222 A | 6/2000 | Ohran | 711/162 |
| 6,085,298 A | 7/2000 | Ohran | 711/162 |
| 6,131,148 A * | 10/2000 | West et al. | 711/162 |
| 6,141,773 A | 10/2000 | St. Pierre et al. | 714/20 |
| 6,154,847 A | 11/2000 | Schofield et al. | 714/4 |
| 6,189,079 B1 * | 2/2001 | Micka et al. | 711/162 |
| 6,219,752 B1 * | 4/2001 | Sekido | 711/114 |
| 6,282,610 B1 * | 8/2001 | Bergsten | 711/114 |
| 6,295,611 B1 | 9/2001 | Connor et al. | 714/20 |
| 6,360,306 B1 * | 3/2002 | Bergsten | 711/162 |
| 6,363,462 B1 * | 3/2002 | Bergsten | 711/162 |
| 6,397,307 B2 * | 5/2002 | Ohran | 711/161 |
| 6,463,501 B1 * | 10/2002 | Kern et al. | 711/100 |
| 6,625,623 B1 * | 9/2003 | Midgley et al. | 707/204 |

* cited by examiner

INCREMENTALLY RESTORING A MASS STORAGE DEVICE TO A PRIOR STATE

Related Application

This application claims the benefit of U.S. Provisional Patent Application Ser. No. 60/257,499, entitled "Methods and Systems for Backing Up and Restoring Computer Data," filed Dec. 21, 2000, which is incorporated herein by reference.

BACKGROUND OF THE INVENTION

1. The Field of the Invention

The present invention relates to backing up and restoring computer data. More specifically, the present invention relates to systems and methods for minimizing the loss of computer data when restoring computer data that was lost due to the interruption.

2. The Prior State of the Art

With the advent of personal computers, businesses worldwide rely on computer data in performing daily business routines. However, a variety of events such as natural disasters, terrorism, or more mundane events such as computer hardware and/or software failures can occur while a computer is processing. These failures often result in causing the computer data to become corrupt, unreliable, or even lost. The corruption or loss of data, such as customer lists, financial transactions, business documents, business transactions, and so forth, can cause havoc to businesses by resulting in the loss of large investments of time and/or money.

The loss or corruption of computer data is particularly devastating in the world of electronic commerce. The Internet has allowed individuals all over the world to conduct business electronically, thereby resulting in the continual upload of electronic orders. However, all copies of the orders are electronic and thus corruption or loss of the electronic computer data can result in the loss of the business represented by the lost orders.

Recognizing the commercial value of reliable computer data, businesses seek ways to protect their data and to reconstruct data that has become corrupt, unreliable, or lost. Traditional approaches of data protection and reconstruction have involved creating a backup copy of the computer data. While it is a simple procedure to preserve a backup copy of an individual file on a floppy disk, the creation of a backup copy becomes more difficult as the amount of data increases.

Perhaps one of the simplest approaches to creating a backup copy of a large volume of computer data is to copy the data from a mass storage system to an archival device, such as one or more magnetic tapes. This method stores large amounts of computer data at the expense of immediate access to the data. The magnetic tapes are stored either locally or remotely, and the data is copied from the magnetic tapes to the mass storage system when problems arise with the mass storage system.

While the use of an archival device to preserve data loss has the advantage of being relatively simple and inexpensive, it also has severe limitations. One such limitation is the amount of time that prevents user accessibility to the computer data while a backup copy is created and while data is reconstructed. The prevention of user accessibility has traditionally been required to ensure that no data has changed during the process. Because user inaccessibility of data is undesirable, backup copies are created less frequently, thereby causing the computer data in the backup copy to become stale. Similarly, transferring computer data from a magnetic tape to a mass storage system can become very lengthy because the computer data is transferred on a file-by-file basis. The time is further lengthened when the archival mass storage device is remotely located and is not accessible over a network. These long reconstruction periods result in extended computer inaccessibility and cost businesses increased amounts of time and money.

Another limitation of the traditional methods is that the backup copy represents data as it existed at a previous instant in time, meaning that the backup copy is not current with subsequent changes made to the original copy. The creation of a backup copy provides the security that a large portion of the computer data can be recovered in the event that the original copy becomes corrupt or lost. This limits the loss to include only the changes made to the original copy since the creation of the last backup copy. However, in some businesses, if the computer data is not current, the data is stale, unreliable, and even useless. This is particularly troubling in the financial world where rates and information change with great frequency. Thus, when the computer data becomes corrupt or lost, the businesses that rely on information that changes frequently are exposed to the risk of losing all of their valuable computer data.

It would, therefore, represent an advancement in the art to have a system and method for backing up computer data that could further minimize the amount of computer data that is lost due to a computer failure or corruption of data. It would also represent an advancement in the art to have a system that allowed data to be backed up without terminating user access to the mass storage system.

SUMMARY OF THE INVENTION

The present invention relates to systems and methods for backing up and restoring computer data. The invention enables computer data to be restored in an incremental manner in the event that data is corrupted or lost. In particular, if data is lost or corrupted, the data can be incrementally advanced through successively older states until a valid set of data is obtained. In this manner, data can be restored to a state that is newer than that associated with a full mirrored or archived copy of the data. Thus, full mirror or archiving operations on a volume of data can be less frequent without the risk of losing changes to the volume of data that have occurred since the last full mirror or archiving operation.

According to the invention, a mass storage device stores a plurality of data blocks at time $T_o$. At $T_o$, a mirrored copy of the data stored of the mass storage device may be made and stored such that the data at $T_o$ can be conveniently restored, if necessary. Obtaining a mirrored copy of data is often a time or resource consuming process that is preferably conducted relatively infrequently. In order to preserve the data that is changed after the mirrored copy of data is created and before a potential event causing loss of data, data blocks that are to be overwritten after $T_o$ are stored in a preservation memory. In particular, if, after $T_o$, a specified data block is to be overwritten as part of a write operation, a copy of the original data block is stored in a preservation memory prior to the original data block being replaced in the mass storage device. In addition, the data block stored in the preservation memory is time-stamped or otherwise marked so as to designate the time of the write operation or to designate a chronological position of the write operation with respect to other write operations.

As write operations are successively performed after time $T_o$, the original data blocks that are to be overwritten are sequentially stored in the preservation memory with an associated time stamp. Thus, the data blocks that are overwritten or otherwise changed after $T_o$ are preserved in a preservation memory and the time or the order in which the data blocks were overwritten in the mass storage device is specified.

In the event that certain data blocks in the mass storage unit device are lost or become corrupted, the data blocks stored in the preservation memory can be used to incrementally restore or reconstruct a valid set of data without reverting completely back to the data as it exists at time $T_o$. If, for example, invalid or corrupted data is written to certain data blocks in the mass storage device after time $T_o$, the original, valid data blocks are stored in a preservation memory as described above. Using the time stamps specifying the chronological sequence in which the data blocks stored in the preservation memory were overwritten in the mass storage device, the data blocks in the preservation memory are written to the current data stored in the mass storage device.

After one or more data blocks from the preservation memory are written back to the mass storage device data in reverse chronological order, a valid set of data is eventually obtained at the mass storage device. Thus, the data blocks stored in the preservation memory are used to reconstruct the data without requiring the data to be reverted completely back to the data as it existed at time $T_o$.

It is noted that, according to the invention, complete mirror or archive operations performed on the full volume of data stored in the mass storage device can be less frequent than would be otherwise required in the absence of the invention The data blocks stored on preservation memory are used to restored corrupted data to a state more recent than that associated with the most recent full mirrored copy of the data. It is also noted that storing a sequence of overwritten data blocks in the preservation memory is typically less resource intensive than performing a full mirror operation on the data of the mass storage device. In addition, the data stored in the preservation memory in response to the write request can be a data block having fine granularity as opposed to being an entire file. For instance, a data block stored in a preservation memory response to a write operation in the mass storage device can be data associated with a single sector or another portion or segment of the mass storage device. Storing data in a preservation memory in this manner avoids the need of copying entire files in response to write operations and permits the data to be preserved independent of any file structure associated with the data.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to backing up and restoring computer data. In particular, the invention enables corrupted data to be restored without requiring the data to be reverted completely back to a most recent full-mirrored copy of the data. Data blocks that are to be overwritten after a point in time in which a mirrored copy of the data has been created are stored in a preservation memory. The data blocks are associated with a time stamp other information that designates the time or the chronological order in which the data blocks were overwritten or the original data blocks in the mass storage device were overwritten. In general, the term "time stamp" refers to any such information designating the chronological order or the time of the data blocks stored in the preservation memory. The data blocks in the preservation memory can be used in the event of data corruption to incrementally roll the current, corrupted copy of the data in the mass storage device to a valid set of data.

Figure 1:
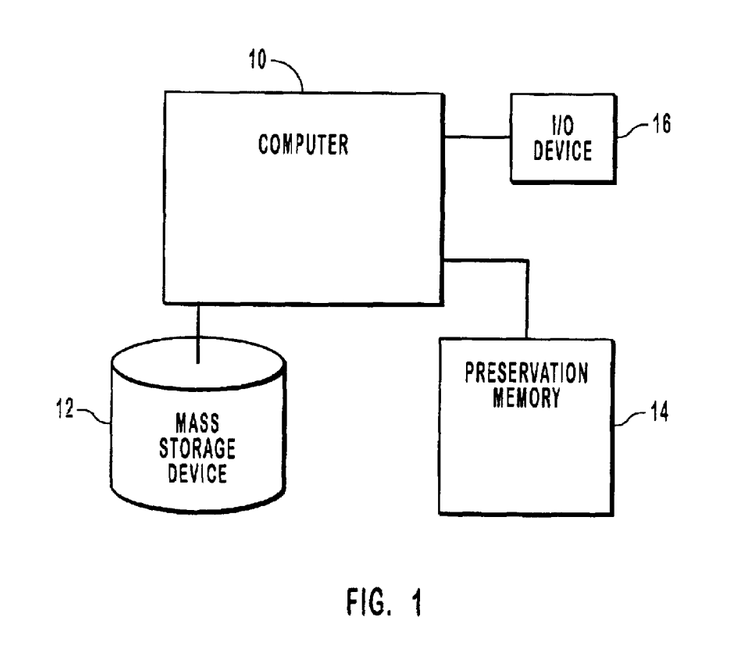
FIG. 1 is a block diagram representing the computer system having an associated mass storage device and preservation memory in which the invention can be implemented.
Figure 6:
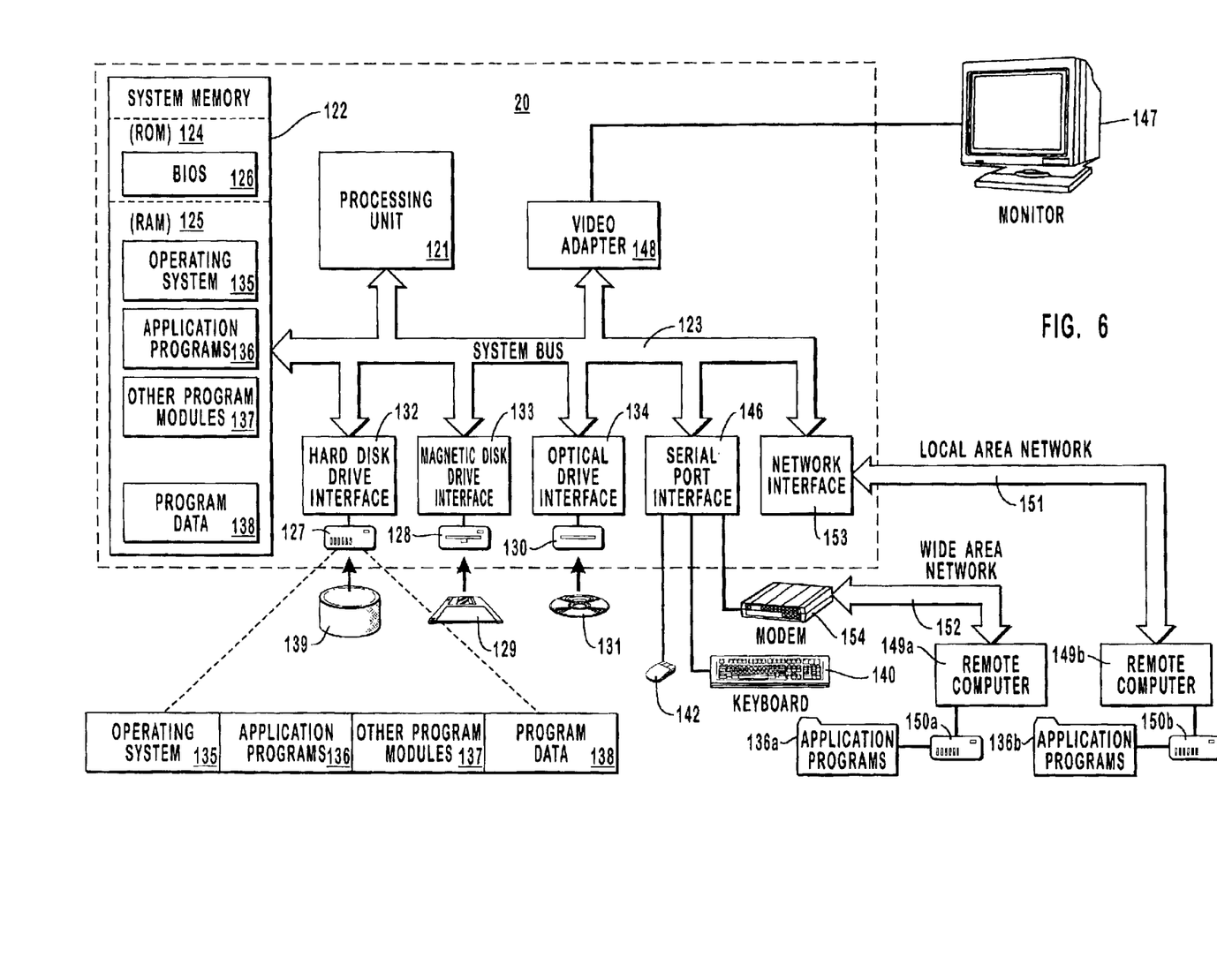
FIG. 6 illustrates a computer system representing an example of a suitable operating environment for the invention.

FIG. 1 illustrates a computer system in which the invention can be practiced. The computer system of FIG. 1 includes a computer 10, a mass storage device 12, a preservation memory 14, and an I/O device 16. Computer 10 can be any computer or other processing device that manages, generates, stores, or otherwise processes data. For instance, computer 10 can be a conventional personal computer, a server, a special purpose computer, or the like. FIG. 6, discussed in greater detail below, sets forth details of one example of a computer in which the invention can be practiced.

Mass storage device 12 is associated with computer 10 and is used to store data obtained from computer 10. In general, mass storage device 12 is a writable, nonvolatile mass storage device. In particular, mass storage device 12 can be the hard drive associated with a conventional personal computer or any other storage volume that is used to store data obtained from computer 10.

Preservation memory 14 is a physical or logical device associated with computer 10 in which data blocks that are to be overwritten in mass storage device 12 are stored. Preservation memory 14 can be a volatile device, such as a random access memory (RAM) or any other device that can store data blocks that are to overwritten in mass storage device 12. Although preservation memory 14 is illustrated as being a separate device in FIG. 1, the preservation memory can be a partition or another portion of mass storage device 12.

As shown in FIG. 1, computer system 10 may include an input/output (I/O) device 16 that allows a user to manipulate data processed by computer 10 and stored in mass storage device 12. In general, computer 10 can have I/O device 16 or any other peripheral device that enables users to manipulate data. In addition, computer 10 typically includes applications or software having data storage requirements satisfied by the mass storage device 12. In general, however, the invention is broad enough to extend to substantially any computer 10 and associated hardware and software, so long as there is a mass storage device 12 for storing data and preservation memory 14 for storing overwritten data blocks.

Figure 2:
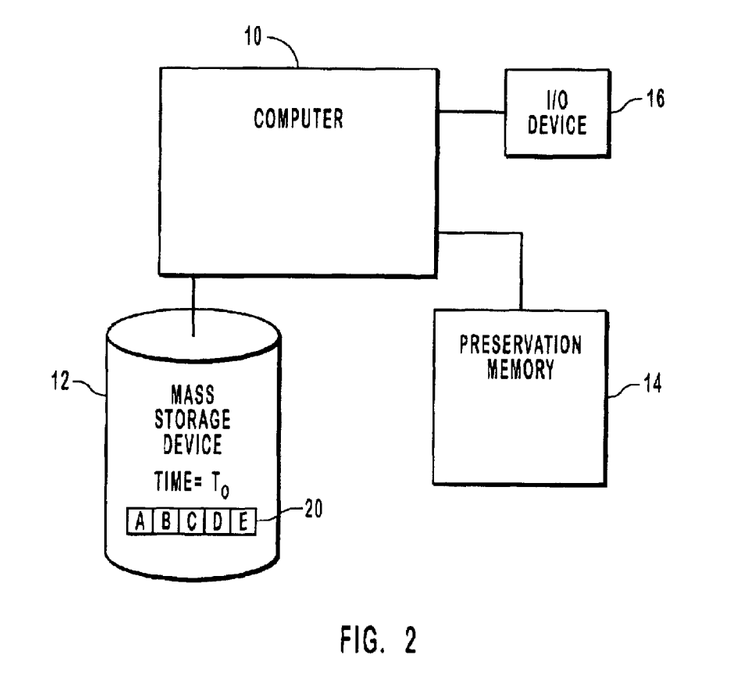
FIG. 2 is a block diagram of the computer system of FIG. 1, showing data stored in the mass storage device at time $T_o$.

FIG. 2 illustrates the computer system of FIG. 1 at a time $T_0$, when mass storage device 12 includes a set of data blocks storing given data. In the example of FIG. 2, for purposes of illustration, mass storage device 12 is shown as including five data blocks, namely, data blocks A, B, C, D, and E. At $T_0$, it is assumed that a mirrored or other backup copy of the full volume of data stored in the mass storage device is created and stored. The mirrored or backup copy of the data obtained at $T_o$ can be generated in any desired manner, including conventional ways. In one embodiment, the mirrored copy or backup of the data at $T_o$ can be obtained using the techniques disclosed in U.S. Pat. No. 5,649,152, entitled "METHOD AND SYSTEM FOR PROVIDING A STATIC SNAPSHOT OF DATA STORED ON A MASS STORAGE SYSTEM" or U.S. Pat. No. 5,835,953, entitled "BACKUP SYSTEM THAT TAKES A SNAPSHOT OF THE LOCATIONS IN A MASS STORAGE DEVICE THAT HAS BEEN IDENTIFIED FOR UPDATING PRIOR TO UPDATING", which are incorporated herein by reference. In general, U.S. Pat. No. 5,649,152 discloses a technique for taking a snapshot of data as it exists at a selected moment by preserving data overwritten by write operations. U.S. Pat. No. 5,835,953 generally describes techniques for obtaining snapshots or mirrored copies of data by transferring minimal amount of data to a remote location. Alternatively, the mirrored or backup copy of the data of the mass storage device 14 at $T_0$ can be obtained using conventional data transfer processes.

Depending on the nature of the data in mass storage device 12, it may be useful to obtain a mirrored or backup copy of the data at $T_o$ that includes logically consistent data. This is particularly important when the data stored in mass storage device 12 represents transactions, each requiring a sequence of write operations or otherwise requiring a set of I/O operations to be performed in order to have a valid and useful set of data. Data is logically inconsistent when fewer than all of the necessary operations in a transaction or in another required sequence of S/O operations have been performed. Thus, depending on the nature of the data stored in mass storage device 12, the mirrored or backup copy of the data at $T_o$ may need to be logically consistent data.

Obtaining a mirrored or backup copy of the data at $T_o$ enables the data blocks A, B, C, D, and E stored at mass storage device 12 at $T_o$ to be reconstructed simply by accessing the mirrored or backup copy of the data. As stated above, however, full mirror or backup operations are often time or bandwidth intensive, such that relatively infrequent complete mirror or backup operations are desirable. As discussed above, and as described in more detail below, the present invention uses preservation memory 14 to store data blocks that enable data of mass storage device 12 to be incrementally restored in reverse chronological order without requiring the data to be reverted completely back to time $T_o$. Although periodic mirrored or backup copies of the data of the mass storage device 12 are often useful, the invention can also be practiced solely on the basis of data blocks being stored at preservation memory 14 without periodic mirrored or backup copies.

Figure 3:
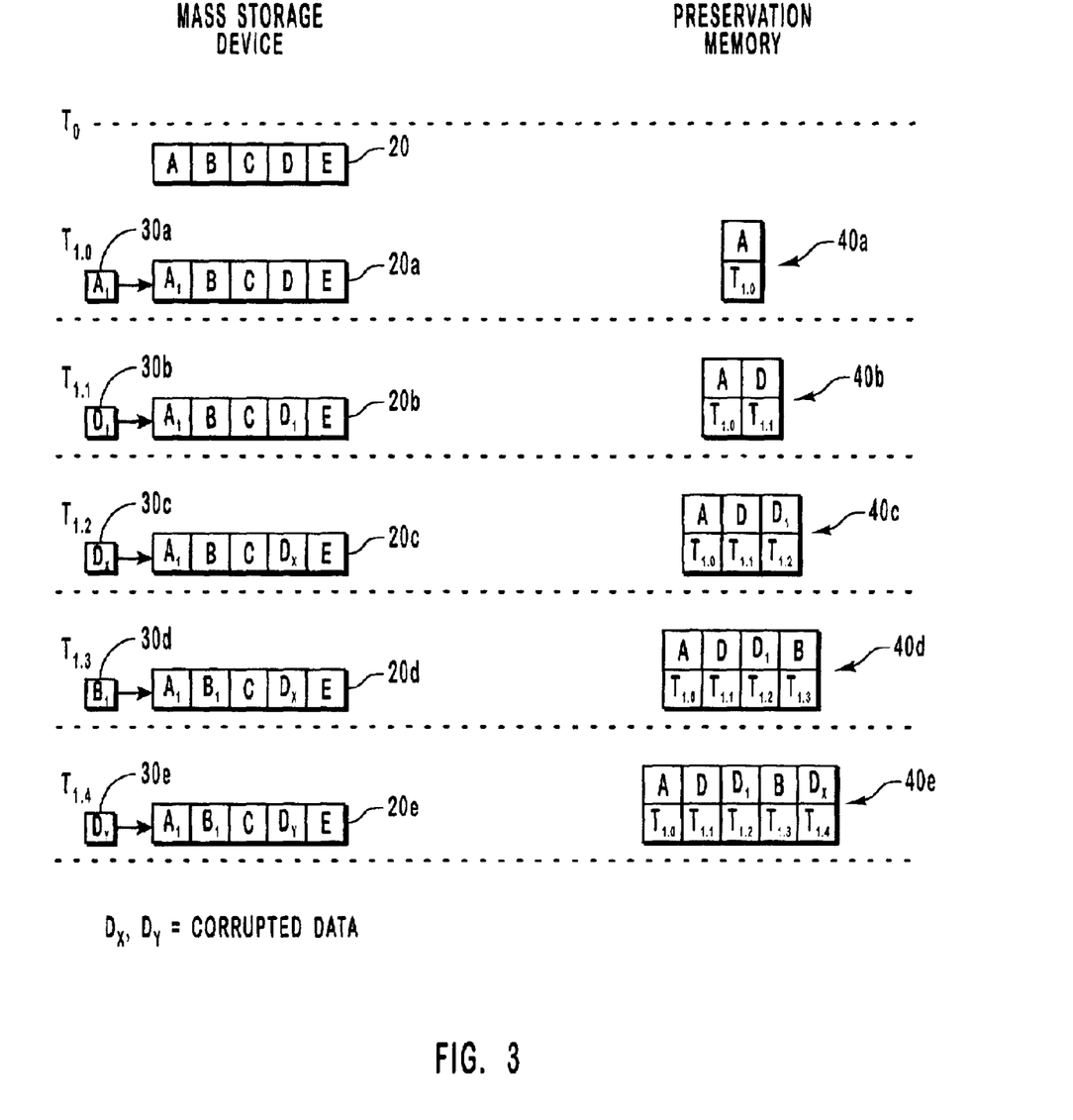
FIG. 3 illustrates a sequence of write operations in which data blocks that are to be overwritten are stored in a preservation memory.

In order to describe the manner in which the data is preserved in the preservation memory after time $T_o$, FIG. 3 presents a specific example of a set of data blocks in the mass storage device and a sequence of the write operations applied thereto. As shown in FIG. 3, the data blocks 20 stored in mass storage device at $T_o$ are designated as (A, B, C, D, E). At $T_{1.0}$, the computer 10 in FIG. 2 issues a write request, whereby data block 30 ($A_1$) is to overwrite existing the data block A, resulting in a set of data blocks 20a ($A_1$, B, C, D, E). In general, in response to a issued write request and prior to the data block in a mass storage device being overwritten with the new data block, the existing data block is stored in the preservation memory, along with a time stamp.

In this example, at $T_{1.0}$, data block A is written to the preservation memory, along with a time stamp designating the time $T_{1.0}$ as shown at 40a. Thus, even though data block A has been overwritten in a mass storage device, the data block A is stored in the preservation memory in the event that this data block is needed to reconstruct corrupted data at some future point.

At time $T_{1.1}$, data block 30b ($D_1$) is written to the data stored in the mass storage device, resulting in a set of data blocks 20b ($A_1$, B, C, $D_1$, E). Prior to the write operation, the data block D, which is to be overwritten, is stored in the preservation memory, along with a time stamp designating the time $T_{11}$, as shown at 40b.

At time $T_{1.2}$, a data corruption event occurs, resulting in data block 30c ($D_x$) being written to the data stored in the mass storage device. As used in this example, the subscripts "x" and "y" represent corrupted data. The data corruption can have substantially any cause, such as data entry problems, software problems, hardware problems, or the like. The data corruption event at time $T_{1.2}$ results in the set of data blocks 20c ($A_1$, B, C, $D_x$, E). Prior to the write operation, the data block $D_1$, which is to be overwritten, is stored in the preservation memory, along with a time stamp designating the time $T_{1.2}$, as shown at 40c.

At time $T_{1.3}$, data block 30d ($B_1$) is written to the data stored in the mass storage device, resulting in a set of data blocks 20d ($A_1$, $B_1$, C, $D_x$, E). Prior to the write operation, the data block B, which is to be overwritten, is stored in the preservation memory, along with a time stamp designating the time $T_{1.3}$, as shown at 40d.

Finally, at time $T_{1.4}$, another data corruption event occurs, resulting in data block 30e ($D_y$) being written to the data stored in the mass storage device. The data corruption event at time $T_{1.4}$ results in the set of data blocks 20e ($A_1$, $B_1$, C, $D_y$, E). Prior to the write operation, the data block $D_x$, which is to be overwritten, is stored in the preservation memory, along with a time stamp designating the time $T_{1.4}$, as shown at 40e.

Thus at time $T_{1.4}$, the data blocks 20e existing at the mass storage device are ($A_1$, $B_1$, C, $D_y$, E). As noted above, the data block $D_y$ represents corrupted data, which potentially makes all of the data stored in mass storage device unusable.

At $T_{1.4}$, preservation memory also has stored therein data blocks (A, D, $D_1$, B, D,) and the corresponding time stamps ($T_{1.0}$, $T_{11}$, $T_{12}$, $T_{13}$, $T_{14}$).

Figure 4:
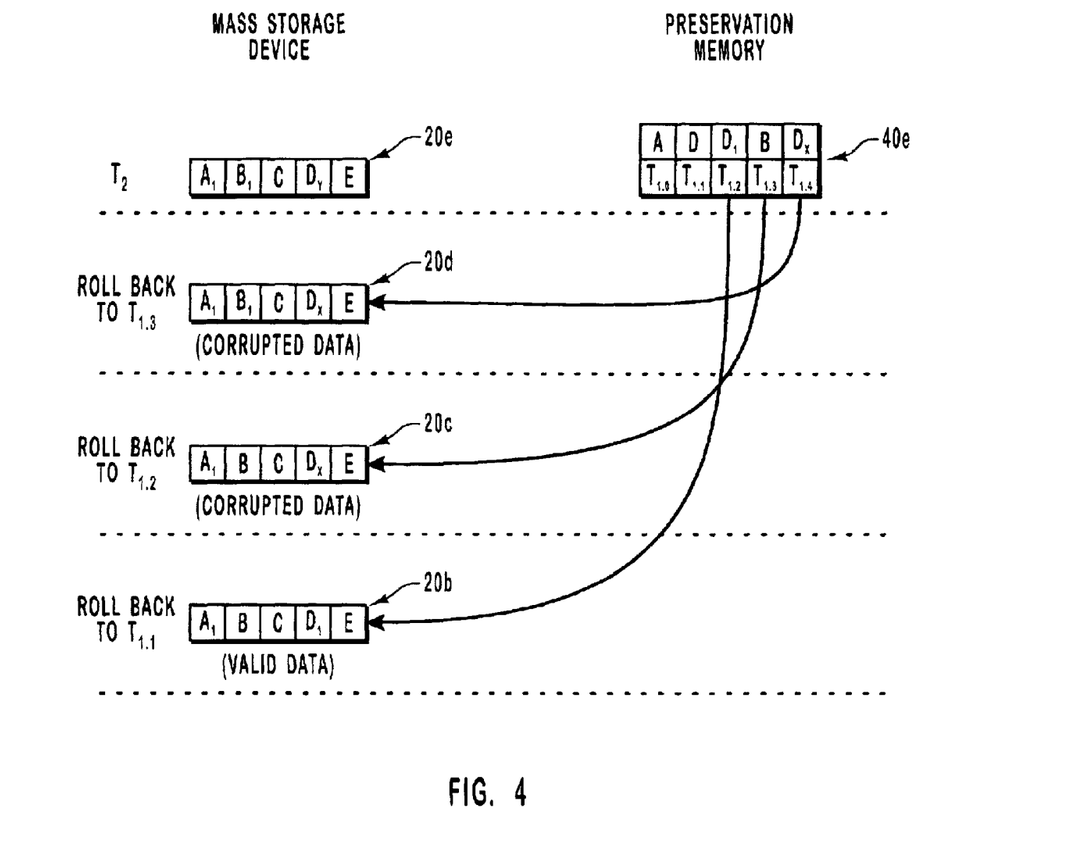
FIG. 4 illustrates an operation in which data in a mass storage device is incrementally restored in response to a data corruption event.

Because the data corruption event has occurred since $T_o$, a valid set of data can be obtain by reverting completely to the data as it existed in the mass storage device at $T_o$ by accessing any mirrored or backup copy of the full volume data that was created at $T_o$. However, reverting completely to the data as it existed at $T_o$ would result in a loss of all subsequent data written to the mass storage device after $T_o$. Thus, according to the invention, in response to the data corruption event, the data blocks stored in the preservation memory are used to incrementally restore the data in the mass storage device in reverse chronological order to at a point at which valid, non-corrupted data exists as shown in FIG. 4. The preservation memory in FIG. 4 at time $T_2$ includes the set of data blocks and corresponding time stamps that existed in the preservation memory at time $T_{1.4}$. Likewise, the mass storage device in FIG. 4 at time $T_2$ includes a set of data blocks 20e ($A_1$, $B_1$, C, $D_y$, E) that existed at $T_{1.4}$ in FIG. 3.

The data restoration operation illustrated in FIG. 4 begins with the current set of potentially corrupted data blocks 20e and the data blocks 40e stored in the preservation memory. The time stamps $T_{1.0}$–$T_{1.4}$ are used to reconstruct the data that previously existed in the mass storage device in reverse chronological order. Thus, the most recently stored data block in preservation memory ($D_x$) is written to the set of data as it existed at time $T_2$ to roll back the set of data in the mass storage device to the state in which it existed at $T_{1.3}$, resulting in a set of data ($A_1$, $B_1$, C, $D_x$, E).

It is noted that this operation of rolling back the data of the mass storage device as illustrated in FIG. 4 can be performed using the actual data stored in the mass storage device or copy of thereof.

Upon rolling back to $T_{1.3}$, it is determined, either by the computer or manually, that the set of data 20d of $T_{13}$ still represents corrupted data, in that data block $D_x$ is corrupted. Because the data remains corrupted, the data of the mass storage device is further rolled back to time $T_{12}$ using data block B of the preservation memory, which has the time stamp $T_{13}$. Thus, the resulting data representing the state of the mass storage device at $T_{1.2}$ is ($A_1$, B, C, $D_x$, E) 20c. Because data blocks 20c also include corrupted data block $D_x$, it is determined that the set of data blocks 20c represent corrupted data. Accordingly, the data is further rolled back to the state at which it existed at the mass storage device at $T_{11}$ by writing to the data at the mass storage device the data block of the preservation memory that is next in reverse chronological order. In particular, data block $D_1$ having time stamp $T_{1.2}$ is written to the data blocks of mass storage device, resulting in a set of data blocks 20b ($A_1$, B, C, $D_1$, E), which represents the data as it existed at the mass storage device at $T_{1.1}$.

At this point, it is determined that the data 20b ($A_1$, B, C, $D_1$, E) represents valid, non-corrupted data. Thus, the data blocks of the preservation memory have been used to incrementally restore in reverse chronological order the data blocks of the mass storage device until such time that a valid set of data is obtained. It is also noted that the data blocks 20b ($A_1$, B, C, $D_1$, E) includes certain data (i.e.$_2$, $A_1$, and $D_1$) that would have not been included in the restored data had the data been reverted completely back to the mirrored or backup copy data of $T_o$. Moreover, this more recent data is restored without requiring a sequence of full mirror or backup operations after $T_o$.

In view of the foregoing, the operation for restoring the data generally involves applying the data blocks the preservation memory in reverse chronological order to a current copy of the data blocks of the mass storage device until such time that the data blocks represent valid non-corrupted data.

As can be understood, when the number of write operations is large or frequent, the number of data blocks stored in the preservation memory can increase rapidly. Thus, in practice, there is a trade-off between the frequency of full mirror or backup operations and the volume of data blocks that are stored in the preservation memory. In one embodiment, the frequency at which the full mirror or backup operations are performed is determined by the frequency at which the preservation memory is filled or reaches a certain size. Other words, as the volume of data stored in the preservation memory approaches the capacity of preservation memory, a full mirror or backup operation is performed on the mass storage device. This enables the data in a preservation memory to be discarded, since it is no longer needed in view of the fact that a more recent mirrored or backup copy of the data of the mass storage device has been created.

While the invention has been described herein in reference to incrementally restoring corrupted data in reverse chronological order in response to a data corruption event, there are other uses for the basic methods of invention. For instance, the data blocks of the preservation memory can be used to roll the data in the mass storage device back to previous state for other reasons. Indeed, in substantially any situation in which a user wishes to obtain data as it existed previously in a mass storage device. In yet another embodiment, data stored in the preservation memory is combined with a mirrored or backup copy of data as it existed at a selected point in time to roll the data of the mass storage device back to a time prior to the creation of the mirrored or backup copy. As described above in reference to FIG. 4, data blocks stored in a reservation memory prior to being overwritten in the mass storage device can be used to incrementally roll back the data in the mass storage device. Thus, if the preservation memory includes a sequence of data blocks that were overwritten in the mass storage device prior to a subsequent mirrored or backup copy of the data of the mass storage device, the sequence of data blocks in the preservation memory can be used to incrementally advance the mirrored or backup copy back in time as desired.

With overwritten data blocks stored in the preservation memory, the invention can be used to establish a virtual mass storage device ("virtual device") that permits data that existed previously in the mass storage device to be accessed. The virtual device 50 of FIG. 5 appears, from the standpoint of the user or an application (i.e., data access program 60) that accesses the virtual device, to contain the data that existed at a previous point in time. For example, the virtual device 50 can be accessed using an operating system and an associated file system as if the virtual device were another hard drive installed on computer 10 of FIG. 1.

Figure 5:
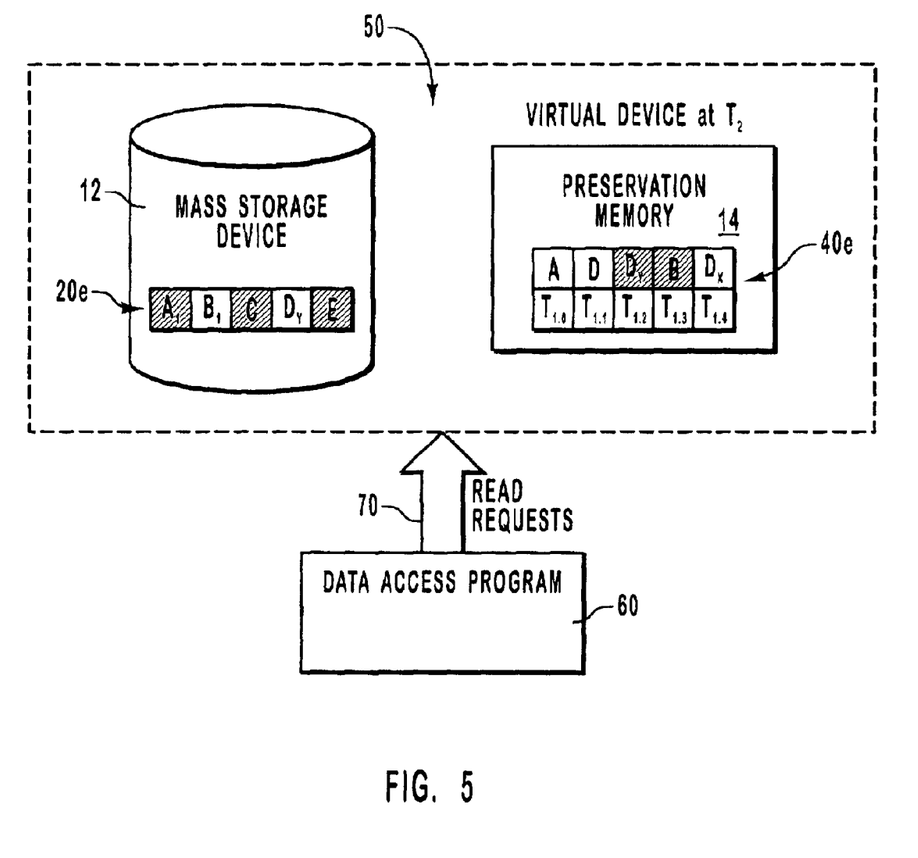
FIG. 5 illustrates the operation of a virtual device that appears as if it contains a copy of data as it existed previously in a mass storage device.

One example of the manner in which the virtual device 50 can be used to access data as it existed at a previous point in time is illustrated in FIG. 5, using the same set of data that has been previously described above in reference to FIGS. 3 and 4. In the example of FIG. 5, it has been determined that a valid set of data can be obtained by rolling the data blocks 20e stored in the mass storage device 12 to the state in which they existed at $T_{1.1}$ using the data blocks 40e stored in preservation memory 14, as has been described in reference to FIG. 4.

When virtual device 50 is used to access data, data access program 60 issues read requests 70 to virtual device 50 rather than addressing the requests specifically to mass storage device 12 or preservation memory 14. In this example, the read requests are used to access the most recent valid set of data that existed prior to the data corruption event that introduced corrupted data blocks $D_x$ and $D_y$ to the set of data blocks in mass storage device 12. As described previously, it can be determined that a set of valid data that existed just prior to the introduction of corrupted data block $D_x$ can be obtained. In other words, the valid set of data at $T_{1.1}$, which is just prior to the data corruption event of $T_{1.2}$, can be obtained.

Upon receiving a request for data, as it existed in the previous, non-corrupted state, the virtual device determines whether the data satisfying the request is to be obtained from mass storage device 12 or preservation memory 14. If the read request is directed to a data block having a non-corrupted version that has been stored in preservation memory 14 at or after the data corruption event (i.e., at or after $T_{1.2}$), the oldest such data block is accessed to respond to the read request. For example, if data access program 60 requests a data block at the "D" position that is associated with the most recent set of valid data, the read request is processed by accessing the oldest non-corrupted data block stored in the preservation memory at or after $T_{1.2}$. Thus, in response to the request for the data block "D", the virtual device accesses data block $D_1$, shown in crosshatch in FIG. 5. In a similar manner, a request for the "B" data block is processed by accessing data block B stored in preservation memory 14, which is also shown in crosshatch in FIG. 5.

If, however, the read request is directed to a data block that does not have a non-corrupted version stored in preservation memory 14 at or after the data corruption event (i.e., at or after $T_{1.2}$), the corresponding data block is accessed from mass storage device 12 to respond to the read request. For instance, requests for data blocks at positions "A", "C", and "E" are processed by accessing the corresponding data blocks $A_1$, C, and E from mass storage device 12, which are shown in crosshatch in FIG. 5. In this way, data access program 60 can request the full set of data blocks that existed at the previous, non-corrupted state from virtual device 50 and receive, in response thereto, the set of data blocks ($A_1$, B, C , $D_1$, and E). Virtual device 50 identifies which data blocks to obtain and whether to obtain the data blocks from mass storage device 12 or preservation memory 14. Using the data blocks, data access program 60 does not need to know the details of mass storage device 12, preservation memory 14, or the data blocks stored thereon, but instead simply issues a request to virtual device 50 as if virtual device 50 contained the prior set of data.

In one embodiment, the prior set of data can be reconstructed in the manner set forth above in reference to FIG. 5. Specifically, the prior set of non-corrupted data can be obtained by establishing a virtual device and reading the prior set of non-corrupted data as set forth above. Data access program 60 then makes the prior set of non-corrupted data available as needed for substantially any use.

The embodiments of the present invention may comprise a special-purpose or general-purpose computer that includes various components, as discussed in greater detail below. Embodiments within the scope of the present invention may also include computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which may cause a general-purpose computer, special-purpose computer, or special-purpose processing device to perform a certain function or group of functions.

FIG. 6 and the following discussion are intended to provide a brief, general description of a suitable computing environment in which the invention may be implemented. Although not required, the invention can be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like, one example having been presented in FIG. 1. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 6, an example system for implementing the invention includes a general-purpose computing device in the form of a computer 120, including a processing unit 121, a system memory 122, and a system bus 123 that couples various system components including system memory 122 to processing unit 121. Computer 120 and the associated component illustrated in FIG. 6 represent a more detailed illustration of computer 10 of FIG. 1. System bus 123 may be any of several types of bus structures including a memory bus or memory controller, a peripheral bus, and a local bus using any of a variety of bus architectures. System memory may include read only memory ("ROM") 124 and random access memory ("RAM") 125. A basic input/output system ("BIOS") 126, containing the basic routines that help transfer information between elements within the computer 120, such as during start-up, may be stored in ROM 124.

Computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. Magnetic hard disk drive 127, magnetic disk drive 128, and optical disk drive 130 are connected to system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for computer 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124, or RAM 125, including an operating system 135, one or more application programs 136, other program modules 137, and program data 138. A user may enter commands and information into computer 120 through keyboard 140, pointing device 142, or other input devices (not shown), such as a microphone, joy stick, game pad, satellite dish, scanner, or the like. These and other input devices are often connected to processing unit 121 through a serial port interface 146 coupled to system bus 123. Alternatively, the input devices may be connected by other interfaces, such as a parallel port, a game port or a universal serial bus ("USB"). A monitor 147 or another display device is also connected to system bus 123 via an interface, such as video adapter 148. In addition to the monitor, personal computers typically include other peripheral output devices (not shown), such as speakers and printers.

Computer 120 may operate in a networked environment using logical connections to one or more remote computers, such as remote computers 149a and 149b. Remote computers 149a and 149b may each be another personal computer, a server, a router, a network PC, a peer device or other common network node. Remote computers 149a and 149b may include many or all of the elements described above relative to the computer 120, although only memory storage devices 150a and 150b and their associated application programs 136a and 136b are illustrated in FIG. 6. The logical connections depicted in FIG. 6 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, computer 120 is connected to local network 151 through a network interface adapter 153 or similar adapter. When used in a WAN networking environment, computer 120 may include a modem 154, a wireless link, or other means for establishing communications over the wide area network 152, such as the Internet. Modem 154, which may be internal or external, is connected to system bus 123 via the serial port interface 146. In a networked environment, program modules depicted relative to computer 120, or portions thereof, may be stored in the remote memory storage device. It will be appreciated that the network connections shown are exemplary and other means of establishing communications over wide area network 152 may be used.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. In a computer system that includes a mass storage device that stores a plurality of data blocks, a method of updating the data blocks while enabling a previous state of the mass storage device to be accessible, comprising the acts of:
   receiving a write request that is to overwrite an existing data block in the mass storage device with a new data block;
   prior to executing the write request, storing a copy of the existing data block in a preservation memory associated with the computer system, wherein the preservation memory includes a sequence of data blocks that have been overwritten in the mass storage device, the sequence of data blocks enabling corrupted data on the mass storage device to be incrementally restored in reverse chronological order;
   associating a time stamp with the copy of the data block in the preservation memory; and
   executing the write request, such that the existing data block stored in the mass storage device is overwritten with the new data block.

2. A method as recited in claim 1, wherein the preservation memory comprises a volatile memory device.

3. A method as recited in claim 1, wherein the preservation memory comprises a portion of the mass storage device.

4. A method as recited in claim 1, further comprising the act of creating a backup copy of the plurality of data blocks stored by the mass storage device prior to the act of receiving the write request.

5. A method as recited in claim 4, wherein the act of creating the backup copy is conducted when the plurality of data blocks represent logically consistent data.

6. A method as recited in claim 1, further comprising the act of restoring the plurality of data blocks stored at the mass storage device to a state in which the plurality of data blocks existed at a previous point in time using the copy of the existing data block stored by the preservation memory.

7. A method as recited in claim 1, further comprising the act of storing a sequence of existing data blocks in the preservation memory in response to one or more write requests that are to overwrite the existing data blocks at the mass storage device and associating a time stamp with each of the existing data blocks of the sequence.

8. A method as recited in claim 7, further comprising the act of restoring the plurality of data blocks stored at the mass storage device to a state in which the plurality of data blocks existed at a previous point in time using the sequence of existing data blocks stored in the preservation memory.

9. A method as recited in claim 8, further comprising the act of experiencing a data corruption event in the mass storage device, wherein the act of restoring the plurality of data blocks is conducted to restore the plurality of data blocks to obtain non-corrupted data.

10. A method as recited in claim 8, wherein the act of restoring comprises the act of applying the data blocks of the sequence of existing data blocks stored in the preservation memory to a current version of the plurality of data blocks stored at the mass storage device in reverse chronological order.

11. A method as recited in claim 9, wherein the act of restoring the plurality of data blocks is conducted to restore the plurality of data blocks to obtain non-corrupted data and wherein the act of restoring the data blocks comprises the act of determining when the non-corrupted data is obtained.

12. A method as recited in claim 1, further comprising the act of establishing a virtual device at the computer system that appears as if it contained the plurality of data blocks stored at the mass storage device in a state in which the plurality of data blocks existed at a previous point in time.

13. A method as recited in claim 12, further comprising the acts of:

receiving, at the virtual machine, a read request specifying a requested data block; and in response to the read request:

if the preservation memory includes a copy of a non-corrupted version of the requested data block that was stored in the preservation memory at or after the previous point in time, processing the read request using the oldest such non-corrupted version of the requested data block stored in the preservation memory; and if the preservation memory does not include said copy of a non-corrupted version of the requested data block that was stored in the preservation memory at or after the previous point in time, processing the read request using a version of the requested data block stored in the mass storage device.

14. In a computer system that includes a mass storage device that stores a plurality of data blocks, a method of restoring the data blocks of the mass storage device to a previous state, comprising the acts of:

iteratively performing the acts of:

receiving a write request that is to overwrite an existing data block in the mass storage device with a new data block;

prior to executing the write request, storing a copy of the existing data block in a preservation memory associated with the computer system and associating a time stamp with the copy of the data block in the preservation memory; and executing the write request, such that the existing data block stored in the mass storage device is overwritten with the new data block;

experiencing a data corruption event whereby at least one of the plurality of data blocks stored in the mass storage device becomes corrupted; and restoring the data blocks of the mass storage device to a previous state by incrementally applying the copies of the existing data blocks from the preservation memory to the plurality of data blocks of the mass storage device in reverse chronological order until the previous state is obtained.

15. A method as recited in claim 14, wherein the reverse chronological order is identified using the time stamps associated with the copies of the existing data blocks.

16. A method as recited in claim 14, further comprising the act of creating a backup copy of the plurality of data blocks stored by the mass storage device prior to iteratively performing the act of receiving a write request.

17. A method as recited in claim 16, wherein the act of restoring the data blocks is conducted such that the previous state represents non-corrupted data and is more recent than the backup copy.

18. A method as recited in claim 14, wherein the iteratively performed act of storing a copy of the existing data block is performed on the data block level and independent of any file structure associated with the mass storage device.

19. A method as recited in claim 18, wherein the plurality of data blocks represent data stored in specified sectors of the mass storage device.

20. In a computer system that includes a mass storage device that stores a plurality of data blocks, a method of establishing a virtual device that enables access to the plurality of data blocks as the data blocks existed at the mass storage device at a previous point in time, comprising the acts of:

storing a current version of the plurality of data blocks in the mass storage device;

maintaining, at a preservation memory associated with the computer system, copies of previous versions of data blocks that have since been overwritten at the mass storage device in response to write requests, the previous versions of the data blocks being associated with time stamps specifying a chronological order in which the data blocks were overwritten, wherein the previous versions of the data blocks enable plurality of data blocks in the mass storage device to be restored incrementally in reverse chronological order when a data corruption event occurs; and providing access to the current version and the copies of the previous version through a virtual device, wherein the virtual device, in response to read request specifying a particular data block as it existed at the previous point in time, determines whether to access the current version of the data block from the mass storage device or the previous version of the data block from the preservation memory.

21. A method as recited in claim 20, wherein:

the current version of the plurality of data blocks includes one or more corrupted data blocks; and at the previous point of time, the plurality of data blocks were non-corrupted.

22. A method as recited in claim 20, wherein, in response to the read request, the virtual device performs the acts of:

if the preservation memory includes a copy of a non-corrupted version of the requested data block that was stored in the preservation memory at or after the previous point in time, processing the read request using the oldest such non-corrupted version of the requested data block stored in the preservation memory; and if the preservation memory does not include said copy of a non-corrupted version of the requested data block that was stored in the preservation memory at or after the previous point in time, processing the read request using a version of the requested data block stored in the mass storage device.

23. A method as recited in claim 20, further comprising experiencing a data corruption event whereby one or more current version of a data block represents corrupted data, wherein the virtual device providing access to the plurality of data blocks as the data blocks existed at the mass storage device at a previous point in time in a non-corrupted state.

24. A method as recited in claim 20, wherein the preservation memory comprises a portion of the mass storage device.

25. A computer system that provides access to data blocks as the data blocks existed at a previous point in time, comprising:

a mass storage device that stores a plurality of data blocks that can be overwritten in response to a write request;

a preservation memory that receives and stores a copies of the data blocks that are to be overwritten prior to the write request being processed and that associates a time stamp with each said copy of a data block, wherein the copies of the data blocks enable the plurality of data blocks in the mass storage device to be incrementally restored in reverse chronological order when a data corruption event occurs; and a virtual device that provides access to a current version of the data blocks stored at the mass storage device and the copies of the data blocks at the preservation memory, wherein the virtual device, in response to read request specifying a particular data block as it existed at the previous point in time, determines whether to access a current version of the specified data block from the mass storage device or a copy of the specified data block from the preservation memory.

26. A computer system as recited in claim 25, wherein the preservation memory comprises a portion of the mass storage device.

27. A computer system as recited in claim 25, wherein the virtual device, from the standpoint of a data access program, appears as if it contained the data blocks as the data blocks existed in the mass storage device at the previous point in time.

28. A computer system as recited in claim 25, wherein the virtual device, in response to the read request, performs the acts of:
if the preservation memory includes a copy of a non-corrupted version of the specified data block that was stored in the preservation memory at or after the previous point in time, processing the read request using the oldest such non-corrupted version of the specified data block stored in the preservation memory; and if the preservation memory does not include said copy of a non-corrupted version of the specified data block that was stored in the preservation memory at or after the previous point in time, processing the read request using a version of the specified data block stored in the mass storage device.

29. A computer system as recited in claim 26, further comprising means for creating a backup copy of the data prior to receiving the write request.

30. In a computer system that includes a mass storage device that stores a plurality of data blocks, a method of updating the data blocks while enabling a previous state of the mass storage device to be accessible, comprising the acts of:
receiving a write request that is to overwrite an existing data block in the mass storage device with a new data block;

prior to executing the write request, storing a copy of the existing data block in a preservation memory associated with the computer system;

associating a time stamp with the copy of the data block in the preservation memory;

executing the write request, such that the existing data block stored in the mass storage device is overwritten with the new data block;

establishing a virtual device at that appears as if it contained the plurality of data blocks stored at the mass storage device in a state in which the plurality of data blocks existed at a previous point in time; and receiving, at the virtual device, a read request specifying a requested data block; and in response to the read request:
if the preservation memory includes a copy of a non-corrupted version of the requested data block that was stored in the preservation memory at or after the previous point in time, processing the read request using the oldest such non-corrupted version of the requested data block stored in the preservation memory; and if the preservation memory does not include said copy of a non corrupted version of the requested data block that was stored in the preservation memory at or after the previous point in time, processing the read request using a version of the requested data block stored in the mass storage device.

* * * * *